United States Patent
Kinser et al.

(10) Patent No.: US 8,831,806 B2
(45) Date of Patent: Sep. 9, 2014

(54) RANGE ESTIMATION FOR A RECHARGEABLE ENERGY STORAGE SYSTEM OF A VEHICLE

(75) Inventors: Christopher A. Kinser, Grand Blanc, MI (US); Todd P. Lindemann, Howell, MI (US)

(73) Assignee: GM Global Technology Operations LLC, Detroit, MI (US)

(*) Notice: Subject to any disclaimer, the term of this patent is extended or adjusted under 35 U.S.C. 154(b) by 250 days.

(21) Appl. No.: 13/284,490

(22) Filed: Oct. 28, 2011

(65) Prior Publication Data
US 2013/0110331 A1     May 2, 2013

(51) Int. Cl.
*B60L 11/00*     (2006.01)

(52) U.S. Cl.
USPC ............ 701/22; 701/29.1; 701/33.4; 701/123; 701/417

(58) Field of Classification Search
CPC combination set(s) only.
See application file for complete search history.

(56) References Cited

U.S. PATENT DOCUMENTS

| | | | |
|---|---|---|---|
| 6,048,289 A * | 4/2000 | Hattori et al. | |
| 7,669,676 B2 * | 3/2010 | Miller | 180/65.265 |
| 7,960,857 B2 * | 6/2011 | King | 307/10.1 |
| 8,117,857 B2 * | 2/2012 | Kelty et al. | 62/129 |
| 2003/0006914 A1 * | 1/2003 | Todoriki et al. | 340/995 |
| 2008/0071472 A1 * | 3/2008 | Yamada | 701/209 |
| 2010/0094496 A1 | 4/2010 | Hershkovitz et al. | |
| 2011/0004363 A1 * | 1/2011 | Severinsky et al. | 701/22 |
| 2011/0082621 A1 * | 4/2011 | Berkobin et al. | 701/33 |
| 2011/0144839 A1 * | 6/2011 | Pudar | 701/22 |
| 2011/0184602 A1 * | 7/2011 | Severinsky et al. | 701/22 |
| 2011/0190971 A1 * | 8/2011 | Severinsky et al. | 701/22 |
| 2011/0301790 A1 * | 12/2011 | Atluri et al. | 701/22 |
| 2012/0082871 A1 * | 4/2012 | Simonini et al. | 429/50 |
| 2012/0109408 A1 * | 5/2012 | Siy et al. | 701/1 |
| 2012/0109413 A1 * | 5/2012 | Smith et al. | 701/1 |
| 2012/0136535 A1 * | 5/2012 | Buford et al. | 701/36 |
| 2012/0143410 A1 * | 6/2012 | Gallagher et al. | 701/22 |
| 2012/0179311 A1 * | 7/2012 | Skaff et al. | 701/22 |
| 2012/0185118 A1 * | 7/2012 | Tate, Jr. | 701/22 |
| 2012/0215446 A1 * | 8/2012 | Schunder et al. | 702/3 |
| 2012/0253568 A1 * | 10/2012 | Uyeki | 701/22 |

FOREIGN PATENT DOCUMENTS

| | | |
|---|---|---|
| KR | 20010096259 A | 11/2001 |
| KR | 20110040220 A | 4/2011 |

OTHER PUBLICATIONS

U.S. Appl. No. 13/205,393, filed Aug. 8, 2011.
Korean Patent and Trademark Office, Office Action for Korean Patent Application No. 10 2012 0118693, mailed Dec. 6, 2013.

* cited by examiner

*Primary Examiner* — Khoi Tran
*Assistant Examiner* — Jonathan L Sample
(74) *Attorney, Agent, or Firm* — Ingrassia Fisher & Lorenz, P.C.

(57) ABSTRACT

Methods, systems, and vehicles are provided that provide for estimating a range of a vehicle with a rechargeable energy storage system (RESS). A sensor unit is configured to measure one or more input values pertaining to the RESS. A processor is coupled to the sensor unit, and is configured to determine an amount of energy available from the RESS using the input values and to obtain a time of day. An estimate of the range for the vehicle is determined based on the time of day and the amount of energy available.

14 Claims, 3 Drawing Sheets

US 8,831,806 B2

RANGE ESTIMATION FOR A RECHARGEABLE ENERGY STORAGE SYSTEM OF A VEHICLE

TECHNICAL FIELD

The present disclosure generally relates to the field of vehicles and, more specifically, to methods and systems for estimating a range for a rechargeable energy storage system (RESS) for a vehicle.

BACKGROUND

Certain vehicles, particularly electric vehicles and hybrid electric vehicles (collectively referred to herein as electric vehicles), have rechargeable energy storage systems (RESS), such as batteries. A range of the RESS, as referenced herein, comprises a distance (for example, a number of miles or kilometers) in which the vehicle can travel using RESS power before the vehicle shuts down. The range of the electric vehicle can be of significance for the driver and occupants of the vehicle, particularly for electric vehicles that do not have a back-up combustion engine or generator.

Accordingly, it is desirable to provide improved methods for estimating the range of an electric vehicle. It is also desirable to provide improved systems for such estimation and to provide vehicles that include such methods and systems. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided for estimating the range of an electric vehicle with rechargeable energy storage system (RESS) for a current drive cycle. The method comprises obtaining a time of day for the current drive cycle, determining an amount of energy available for the RESS, and estimating the range for the vehicle based upon the time of day and the amount of energy available via a processor.

In accordance with another exemplary embodiment, a system is provided for a system for estimating a range of a rechargeable energy storage system (RESS) of a vehicle for a current drive cycle. The system includes a sensor unit and a processor. The sensor unit is configured to measure one or more input values pertaining to the RESS. The processor is coupled to the sensor unit, and is configured to determine an amount of energy available for the RESS using the input values, obtain a time of day, and estimate the range for the RESS based upon the time of day and the amount of energy available.

In accordance with a further exemplary embodiment, a vehicle is provided. The vehicle includes a drive system and an estimation system. The drive system includes a rechargeable energy storage system (RESS). The estimation system is coupled to the RESS, and is configured to estimate the amount of energy available from the RESS for a current drive cycle of a vehicle. The estimation system includes a sensor unit and a processor. The sensor unit is configured to measure one or more input values pertaining to the RESS. The processor is coupled to the sensor unit, and is configured to determine an amount of energy available for the RESS using the input values, obtain a time of day, and estimate the range for the RESS based upon the time of day and the amount of energy available.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
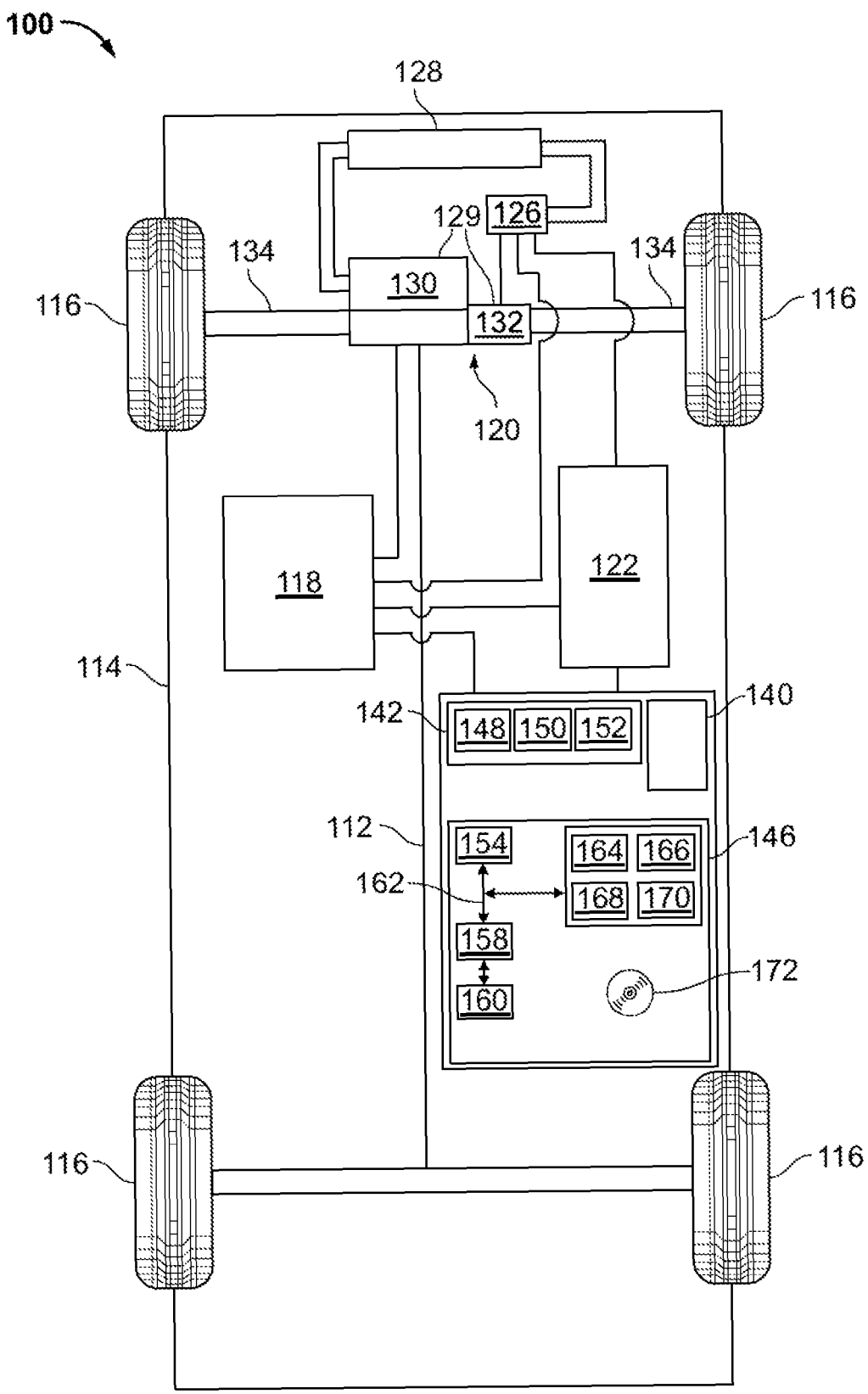
FIG. 1 is a functional block diagram of a vehicle that includes a rechargeable energy storage system (RESS) and a system for estimating the range of the vehicle for a current drive cycle, in accordance with an exemplary embodiment.

FIG. 1 illustrates a vehicle 100, or automobile, according to an exemplary embodiment. As described in greater detail further below, the vehicle 100 is configured to estimate the range of the vehicle 100 based on a time of day of the current ignition cycle and an estimated amount of energy remaining in the RESS.

The vehicle 100 includes a chassis 112, a body 114, four wheels 116, and an electronic control system 118. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114.

The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 100 may also incorporate any one of, or combination of, a number of different types of electrical propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

In one exemplary embodiment illustrated in FIG. 1, the vehicle 100 is a hybrid electric vehicle (HEV), and further includes an actuator assembly 120, the above-referenced RESS 122, a range estimation system 124, a power inverter assembly (or inverter) 126, and a radiator 128. The radiator 128 is connected to the frame at an outer portion thereof and although not illustrated in detail, includes multiple cooling channels therein that contain a cooling fluid (i.e., coolant) such as water and/or ethylene glycol (i.e., "antifreeze") and is coupled to a combustion engine 130 and the inverter 126.

The actuator assembly 120 includes at least one propulsion system 129 mounted on the chassis 112 that drives the wheels 116. Specifically, as depicted in FIG. 1, the actuator assembly 120 includes a combustion engine 130 and an electric motor/generator (or motor) 132. As will be appreciated by one skilled in the art, the electric motor 132 includes a transmission therein, and, although not illustrated, also includes a stator assembly (including conductive coils), a rotor assembly (including a ferromagnetic core), and a cooling fluid or coolant flowing to and from the radiator 128. The stator assembly and/or the rotor assembly within the electric motor 132 may include multiple electromagnetic poles, as is commonly understood.

Still referring to FIG. 1, the combustion engine 130 and the electric motor 132 are integrated such that one or both are mechanically coupled to at least some of the wheels 116 through one or more drive shafts 134. In one embodiment, the vehicle 100 is a "series HEV," in which the combustion engine 130 is not directly coupled to the transmission, but coupled to a generator (not shown), which is used to power the electric motor 132. In another embodiment, the vehicle 100 is a "parallel HEV," in which the combustion engine 130 is directly coupled to the transmission by, for example, having the rotor of the electric motor 132 rotationally coupled to the drive shaft of the combustion engine 130. In yet another embodiment, the vehicle 100 comprises a pure electric vehicle, without a combustion engine.

The RESS 122 is mounted on the chassis 112, and is electrically connected to the inverter 126. The RESS 122 preferably comprises a rechargeable battery having a pack of battery cells. In one embodiment, the RESS 122 comprises a lithium iron phosphate battery, such as a nanophosphate lithium ion battery. Together the RESS 122, the inverter 126 and the propulsion system 129 provide a drive system to propel the vehicle 100. A range for the RESS 122 is estimated by a range estimation system 124, as described below.

As depicted in FIG. 1, the range estimation system 124 includes a clock 140, a sensor array 142, and a computer system 146. In addition, although not illustrated as such, the range estimation system 124 (and/or one or more components thereof) may be integral with the electronic control system 118 and may also include one or more power sources. In one embodiment, the range estimation system 124 is part of an RESS control module of the vehicle 100.

Then clock 140 obtains or determines a time of day for the current drive cycle of the vehicle 100. Preferably, the time of day pertains to a time of day at which the current drive cycle (also referenced herein as an ignition cycle) of the vehicle begins. In one embodiment, the clock 140 provides information pertaining to the time of day to the computer system 146 for processing and for use in estimating a range of the vehicle 122 during the current drive cycle. In other embodiments, the clock 140 may be part of the computer system 146 and/or may be part of one or more other systems of the vehicle 100. In yet other embodiments, the time of day may instead be obtained by a clock disposed outside the vehicle, such as part of a remote server that communicates with the vehicle 100 via a wireless network, such as via a satellite or cellular network.

The sensor array 142 includes one or more temperature sensors 148, one or more RESS sensors 150, and one or more mileage sensors 152. The one or more temperature sensors 148 measure an ambient temperature outside the vehicle. In one embodiment, the ambient temperature is disposed on or proximate an outer surface of the vehicle 100, such as on a rooftop of the vehicle 100. The temperature sensors 148 provide signals and/or information pertaining to the measurements to the computer system 146 for processing and for use in estimating the range of the vehicle 122 for the current drive cycle.

The one or more RESS sensors 150 are preferably disposed proximate the RESS 122 (preferably within or adjacent to the RESS 122). The RESS sensors 150 measure one or more input values pertaining to a state of charge or capacity of the RESS 122 (such as a current, voltage, or resistance of the RESS 122). The RESS sensors 150 provide signals and/or information pertaining to the measurements to the computer system 146 for processing and for use in estimating the range of the vehicle 122 for the current drive cycle.

The one or more mileage sensors 152 measure a distance travelled by the vehicle 100 during a drive cycle. In one example, the mileage sensor 152 comprises an odometer for the vehicle 100. The one or more mileage sensors 152 provide signals and/or information pertaining to the measurements to the computer system 146 for processing and for use in calculating average energy usage values, and ultimately for estimating the range of the vehicle 122 for subsequent drive cycles.

The computer system 146 is coupled to the clock 140, the sensor array 142, and the RESS 122. In certain embodiments, the computer system 146 is further coupled to the electronic control system 118. The computer system 146 utilizes the data and information from the clock 140 (including the time of day of the current drive cycle for the vehicle 100) and the measured values from the sensor array 142 (including the ambient temperature value, the mileage of the vehicle 100, and the input values pertaining to the RESS 122) in estimating the range of the vehicle 122 for the current drive cycle. In a preferred embodiment, the computer system 146 performs these functions in accordance with steps of the processes 200, 300 described further below in connection with FIGS. 2 and 3.

In certain embodiments, the computer system 146 may also include one or more of the sensors 148, 150, 152, the clock 140, the electronic control system 118 and/or portions thereof, and/or one or more other devices. In addition, it will be appreciated that the computer system 146 may otherwise differ from the embodiment depicted in FIG. 1. For example, the computer system 146 may be coupled to or may otherwise utilize one or more remote computer systems and/or other control systems not illustrated in FIG. 1.

In the depicted embodiment, the computer system 146 includes a processor 154, a memory 156, an interface 158, a storage device 160, and a bus 162. The processor 154 performs the computation and control functions of the computer system 146, and may comprise any type of processor or multiple processors, single integrated circuits such as a microprocessor, or any suitable number of integrated circuit devices and/or circuit boards working in cooperation to accomplish the functions of a processing unit. During operation, the processor 154 executes one or more programs 164 contained within the memory 156 and, as such, controls the general operation of the computer system 146 and the range estimation system 124, preferably in executing the steps of the processes described herein, such as the steps of the processes 200, 300 described further below in connection with FIGS. 2 and 3.

The memory 156 can be any type of suitable memory. This would include the various types of dynamic random access memory (DRAM) such as SDRAM, the various types of static RAM (SRAM), and the various types of non-volatile memory (PROM, EPROM, and flash). In certain examples, the memory 156 is located on and/or co-located on the same computer chip as the processor 154.

In a preferred embodiment, the memory 156 stores the above-referenced program 164 along with a plurality of energy accumulators 166, 168, 170 of energy usage from the RESS 122 based on previous drive cycles of the vehicle 100 during different time intervals for the day. Each time interval corresponds to a different time interval for the day associated with a relative range of temperatures as compared with the other time intervals.

In the depicted embodiment, a first accumulator 166 tracks, and stores values of, energy usage for the RESS 122 for recent drive cycles of the vehicle 100 that occurred during a daytime time interval. A second accumulator 168 tracks, and stores values of, energy usage for the RESS 122 for recent drive cycles of the vehicle 100 that occurred during a nighttime time interval. A third accumulator 170 tracks, and stores values of, energy usage for the RESS 122 for recent drive cycles of the vehicle 100, regardless of the time of day in which these drive cycles occurred. Each accumulator 166, 168, 170 preferably includes an average energy usage value and a temperature value (or range of temperature values) associated with the respective time intervals stored in the memory 156.

In one such example, the first accumulator 166 includes average values (or data for use in calculating average values) of energy usage from the RESS 122 for recent drive cycles that began between 10:00 am and 10:00 pm, while the second accumulator 168 includes such values for drive cycles that began between 10:00 pm and 10:00 am. Also in this example, the third accumulator 170 includes aggregate average values (or data for use in calculating average values) of energy usage from the RESS 122 for recent drive cycles, regardless of the time of day in which the drive cycles began. The particular times of day associated with each time interval and/or accumulator may vary. Similarly, the number of accumulators and time intervals may vary. For example, in one embodiment, a separate accumulator may be used for each hour of the day, or for each two hour segment of the day, and so on.

The bus 162 serves to transmit programs, data, status and other information or signals between the various components of the computer system 146. In one embodiment, the bus 162 may be part of a vehicle communication bus for the vehicle 100. The bus 162 can be any suitable physical or logical means of connecting computer systems and components. This includes, but is not limited to, direct hard-wired connections, fiber optics, infrared and wireless bus technologies. During operation, the program 164 is stored in the memory 156 and executed by the processor 154.

The interface 158 allows communication to the computer system 146, for example from a system driver and/or another computer system, and can be implemented using any suitable method and apparatus. It can include one or more network interfaces to communicate with other systems or components. The interface 158 may also include one or more network interfaces to communicate with technicians, and/or one or more storage interfaces to connect to storage apparatuses, such as the storage device 160.

The storage device 160 can be any suitable type of storage apparatus, including direct access storage devices such as hard disk drives, flash systems, floppy disk drives and optical disk drives. In one exemplary embodiment, the storage device 160 comprises a program product from which memory 156 can receive a program 164 that executes one or more embodiments of one or more processes of the present disclosure, such as the steps of the processes 200, 300 of FIGS. 2 and 3, described further below. In another exemplary embodiment, the program product may be directly stored in and/or otherwise accessed by the memory 156 and/or a disk (e.g., disk 172), such as that referenced below.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 154) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system 146 may also otherwise differ from the embodiment depicted in FIG. 1, for example in that the computer system 146 may be coupled to or may otherwise utilize one or more remote computer systems and/or other control systems.

Figure 2:
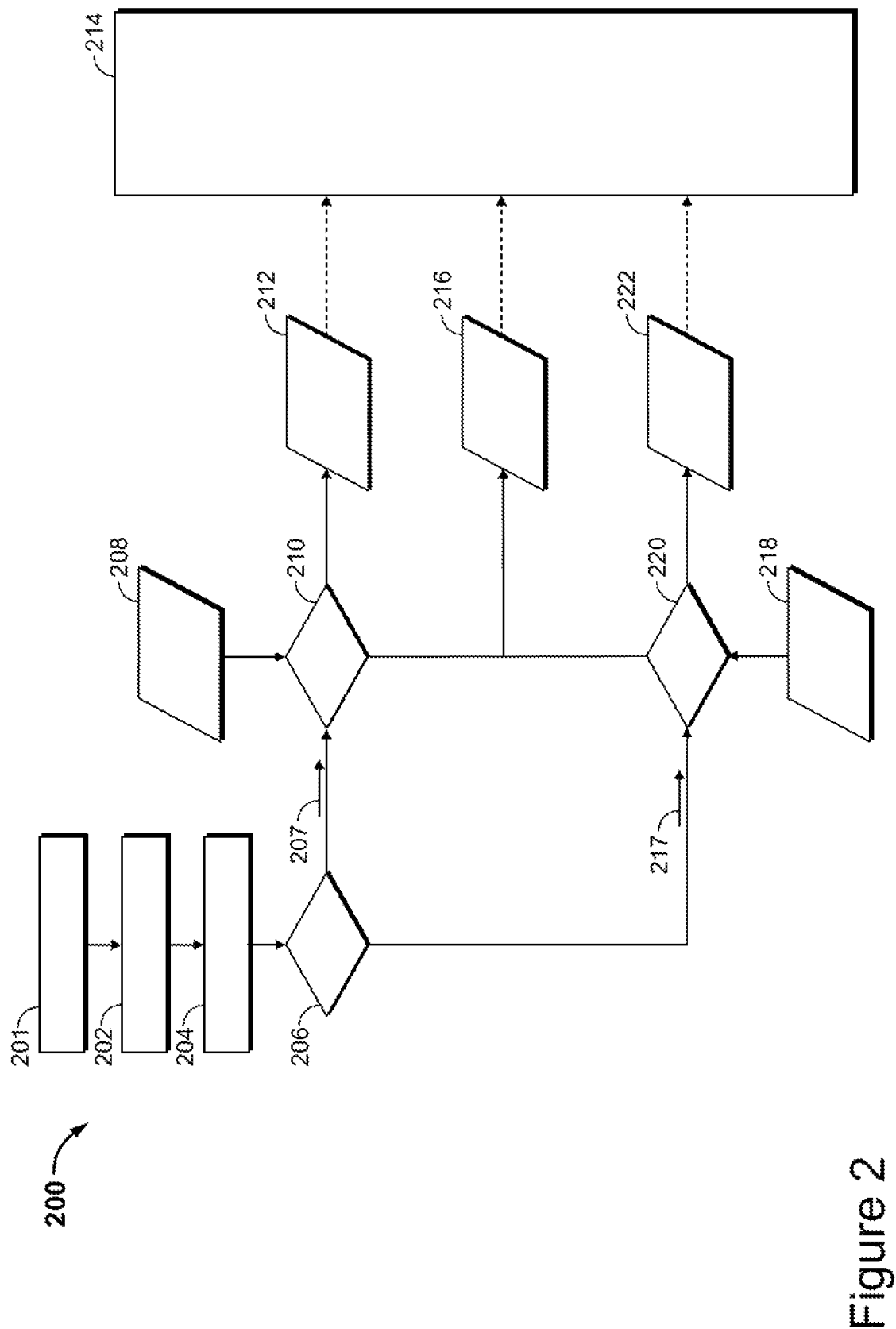
FIG. 2 is a flowchart of a process for estimating the range of a vehicle with a RESS, such as the vehicle of FIG. 1, in accordance with an exemplary embodiment.

FIG. 2 is a flowchart of a process 200 for estimating the range of a vehicle, in accordance with an exemplary embodiment. The process 200 estimates the range of the vehicle based on a current amount of energy of the RESS and a time of day for the current drive cycle. The process 200 can be utilized in connection with the vehicle 100, the RESS 122, and the range estimation system 124 of FIG. 1.

As depicted in FIG. 2, the process 200 includes the step of obtaining a time of day (step 201). The time of day is preferably obtained at the beginning of a current drive cycle of the vehicle. In one embodiment, the time of day is measured by the clock 140 of FIG. 1 and provided to the processor 154 of FIG. 1. In another embodiment, the time of day is determined at least in part by the processor 154 of FIG. 1.

A current temperature is measured (step 202). The current temperature comprises an ambient air temperature outside but proximate to the vehicle. The current temperature is preferably measured by a local or remote temperature sensor that is not affected by unwanted sources of energy. The current temperature could be measured by a temperature sensor 148 of FIG. 1 and provided to the processor 154 of FIG. 1.

In addition, an amount of energy available from the RESS is determined (step 204). The amount of energy available from the RESS is preferably calculated by the processor 154 of FIG. 1 using RESS inputs measured by one or more RESS sensors 150 of FIG. 1. In one embodiment, the amount of energy available from the RESS is determined using an energy capacity of the RESS and a percentage state of charge of the RESS, for example using techniques disclosed in co-pending, commonly assigned U.S. patent application Ser. No. 13/205,393 filed on Aug. 8, 2011, entitled "Electrical Vehicle Range Prediction", the entirety of which is incorporated by reference herein.

A determination is made as to which time interval corresponds with the time of day of step 201 (step 206). In one embodiment, the time of day corresponds to one of a plurality of time intervals for the day, with each time interval associated with a respective temperature range as compared with the other time interval(s). Specifically, the plurality of time intervals comprises at least a first, relatively warmer, time interval, and at least a second, relatively cooler, time interval.

In one embodiment, the time interval of step 206 is selected from two possible general times of day, namely a daytime (or relatively warmer) time interval and a nighttime (or relatively cooler) time interval. In one example, the daytime interval is between 10:00 am and 10:00 pm, and the nighttime interval is between 10:00 pm and 10:00 am. The particular time intervals may vary. Similarly, the number of time intervals may vary. For example, in one embodiment, a separate accumulator of memory 156 of FIG. 1 may be used for each hour of the day, or for each two hour segment of the day, and so on.

If it is determined in step 206 that the current time of day corresponds to the first (daytime or relatively warmer) time interval, then the process proceeds along a first branch 207. Specifically, an average temperature is retrieved for the first time interval (step 208). The average temperature of step 208 is preferably retrieved from the first accumulator 166 of the memory 156 of FIG. 1 by the processor 154 of FIG. 1. The average temperature comprises an average temperature, such as a mean temperature, of the outside air temperature for the most recent drive cycles that occurred during the first time interval.

For example, in one embodiment in which the first time interval is between 10:00 am and 10:00 pm, the average temperature may comprise an average outside air temperature for the most recent drive cycles that began between 10:00 am and 10:00 pm. In one such embodiment, all drive cycles that occurred between 10:00 am and 10:00 pm are included in this average, provided that such drive cycles occurred within a predetermined number of days from the current date (such as the past thirty days, by way of example only). However, the predetermined number of days may vary in other embodiments. In addition, in certain embodiments, a different measure of "most recent" drive cycles may also be used.

A determination is then made as to whether the current temperature of step 202 is consistent with the average temperature of step 208 (step 210). The current temperature of step 202 is determined to be consistent with the average temperature if the current temperature of step 202 is within a range of values associated with the average temperature of step 208. In one such embodiment, the current temperature of step 202 is determined to be consistent with the average temperature of step 208 if a difference between the current temperature of step 202 and the average temperature of step 208 is less than a predetermined magnitude. In one such embodiment, the predetermined magnitude is equal to ten degrees Celsius. However, in other embodiments, the predetermined magnitude may vary, and/or other thresholds (for example, a percentage threshold for the difference) and/or criteria may be used.

Figure 3:
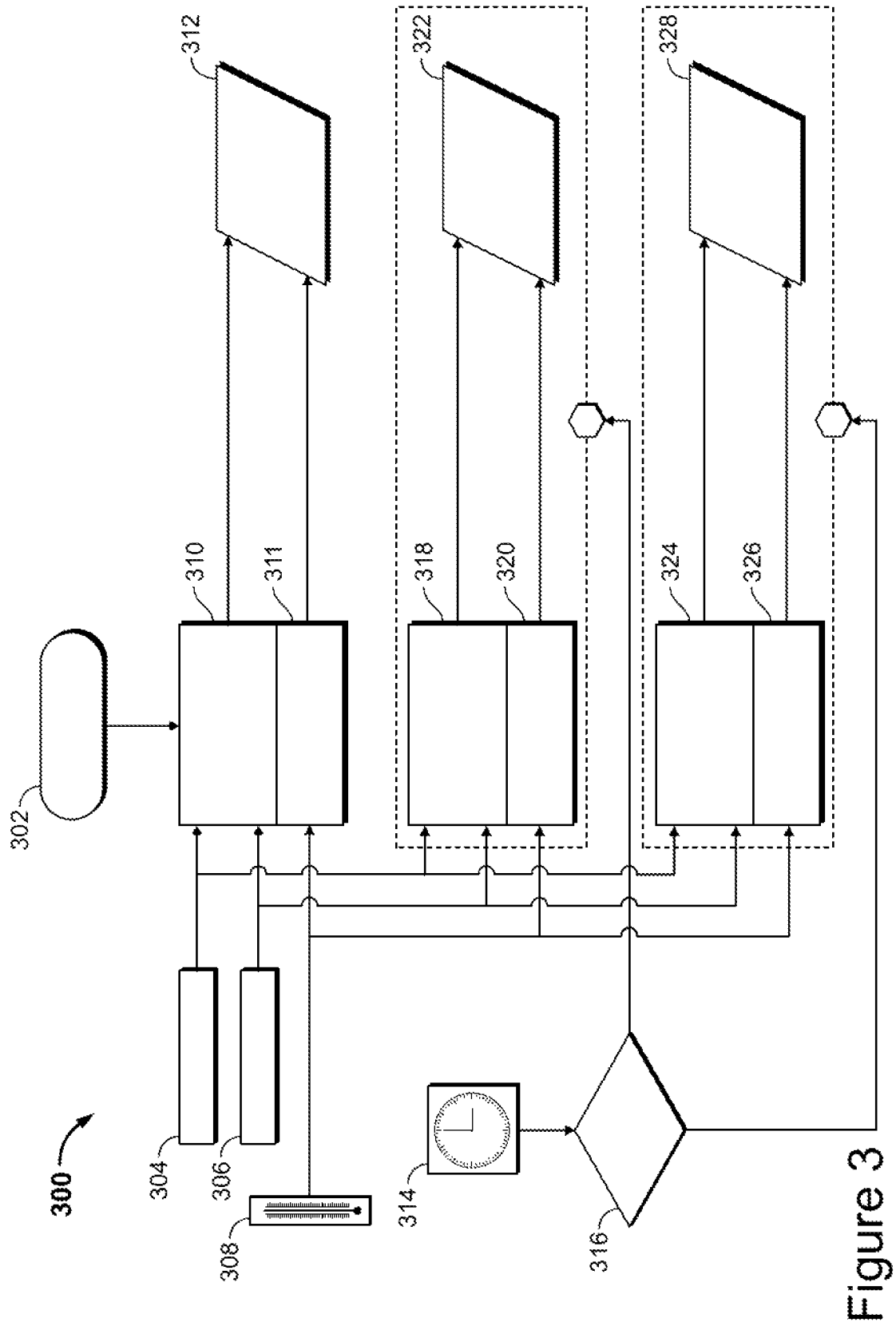
FIG. 3 is a flowchart of a process for generating prior energy usage values for use in estimating the range of the vehicle in the process of FIG. 2, in accordance with an exemplary embodiment.

If it is determined that the current temperature of step 202 is consistent with the average temperature of step 208, then an average energy consumption value is obtained or determined for the first time interval (step 212). The average energy consumption value comprises an average value of energy consumption per unit of distance (for example, kilowatt*hours per mile or kilowatt*hours per kilometer) used by the vehicle during the most recent previous drive cycles that occurred during the first time interval. The process of calculating the average energy consumption value for the first time interval (and for the other intervals) is depicted in FIG. 3 and described further below in connection with one exemplary embodiment.

Similar to the discussion above, the "most recent" drive cycles may include drive cycles within a predetermined number of days from the current date (such as the past thirty days, by way of example only), but may vary in other embodiments. In one embodiment (such as the embodiment described further below in connection with FIG. 3), the average energy consumption value of step 212 is previously calculated by the processor 154 of FIG. 1 during a previous drive cycle, and is retrieved from the first accumulator 166 of the memory 156 of FIG. 1 in the current drive cycle. In another embodiment, the average energy consumption value of step 212 may be calculated by the processor 154 of FIG. 1 during a current drive cycle based on information retrieved from the first accumulator 166 of the memory 156 of FIG. 1 in the current drive cycle.

The range of the vehicle is then estimated (step 214). As mentioned above, as used herein, the range of the vehicle comprises a distance in which the vehicle is expected to be able to travel on RESS power before the RESS is depleted of sufficient energy to propel the vehicle 100 and shuts down or an alternative source of power is used to propel the vehicle (such as a backup gas powered generator). The range is preferably estimated by the processor 154 using the amount of energy of step 204 and the average energy consumption value of the first time interval from step 212. Specifically, the amount of energy of step 204 is preferably divided by the average energy consumption value of step 212 to calculate an estimated distance that the vehicle is expected to be able to travel on RESS power before the RESS can no longer provide power. The range may be provided to the driver (for example, on a display in a cockpit of the vehicle) to allow the driver to plan accordingly, for example by charging the RESS further before travelling a distance that exceeds the estimated range.

Returning now to step 210, if it is determined that the current temperature of step 202 is inconsistent with the average temperature of step 208, then an aggregate average energy consumption value is obtained (step 216). The aggregate average energy consumption value comprises an average value of energy consumption per unit of distance (for example, miles or kilometers) used by the vehicle during the most recent previous drive cycles, regardless of the time of day in which the drive cycles occurred. The aggregate average energy consumption value is preferably stored in the third accumulator 170 in the memory 156 of FIG. 1. The process of calculating the aggregate average energy consumption value is depicted in FIG. 3 and described further below in connection with one exemplary embodiment.

Similar to the discussion above, the "most recent" drive cycles may include drive cycles within a predetermined number of days from the current date (such as the past thirty days, by way of example only), but may vary in other embodiments. In one embodiment (such as the embodiment described further below in connection with FIG. 3), the aggregate average energy consumption value of step 216 is previously calculated by the processor 154 of FIG. 1 during a previous drive cycle, and is retrieved from the first accumulator 166 of the memory 156 of FIG. 1 in the current drive cycle. In another embodiment, the aggregate average energy consumption value of step 216 may be calculated by the processor 154 of FIG. 1 during a current drive cycle based on information retrieved from the first accumulator 166 of the memory 156 of FIG. 1 in the current drive cycle.

The process then proceeds to the above-referenced step 214, but using the aggregate average energy consumption value of step 216. Specifically, the range is preferably estimated by the processor 154 using the amount of energy of step 204 and the aggregate average energy consumption value from step 216. The amount of energy of step 204 is preferably divided by the aggregate average energy consumption value of step 216 to calculate an estimated distance that the vehicle is expected to be able to travel on RESS power before the vehicle shuts down. As discussed above, the range may be provided to the driver (for example, on a display in a cockpit of the vehicle) to allow the driver to plan accordingly, for example by charging the RESS further before travelling a distance that exceeds the estimated range.

Returning now to step 206, if it is determined that the current time of day corresponds to the second (nighttime or relatively cooler) time interval, then the process proceeds along a second branch 217. Specifically, an average temperature is retrieved for the second time interval (step 218). The average temperature of step 218 is preferably retrieved from the second accumulator 168 of the memory 156 of FIG. 1 by the processor 154 of FIG. 1. The average temperature comprises an average temperature, such as a mean temperature, of the outside air temperature for the most recent drive cycles that occurred during the second time interval.

For example, in one embodiment in which the second time interval is between 10:00 pm and 10:00 am, the average temperature may comprise an average outside air temperature for the most recent drive cycles that began between 10:00 pm and 10:00 am. In one such embodiment, all drive cycles that occurred between 10:00 pm and 10:00 am are included in this average, provided that such drive cycles occurred within a predetermined number of days from the current date (such as the past thirty days, by way of example only). However, the predetermined number of days may vary in other embodiments. In addition, in certain embodiments, a different measure of "most recent" drive cycles may also be used.

A determination is then made as to whether the current temperature of step 202 is consistent with the average temperature of step 218 (step 220). The current temperature of step 202 is determined to be consistent with the average temperature of step 218 if the current temperature is within a range of values associated with the average temperature. In one such embodiment, the current temperature of step 202 is determined to be consistent with the average temperature of step 218 if a difference between the current temperature of step 202 and the average temperature of step 218 is less than a predetermined number of degrees. In one such embodiment, the predetermined number is degrees is equal to ten degrees Celsius. However, in other embodiments, the predetermined number of degrees may vary, and/or other thresholds (for example, a percentage threshold for the difference) and/or criteria may be used.

If it is determined that the current temperature of step 202 is consistent with the average temperature of step 218, then an average energy consumption value is obtained or determined for the second time interval (step 222). The average energy consumption value comprises an average value of energy consumption per unit of distance (for example, miles or kilometers) used by the RESS during the most recent previous drive cycles that occurred during the second time interval. The process of calculating the average energy consumption value for the second time interval is depicted in FIG. 3 and described further below in connection therewith in connection with one exemplary embodiment.

Similar to the discussion above, the "most recent' drive cycles may include drive cycles within a predetermined number of days from the current date (such as the past thirty days, by way of example only), but may vary in other embodiments. In one embodiment (such as the embodiment described further below in connection with FIG. 3), the average energy consumption value of step 222 is previously calculated by the processor 154 of FIG. 1 during a previous drive cycle, and is retrieved from the second accumulator 168 of the memory 156 of FIG. 1 in the current drive cycle. In another embodiment, the average energy consumption value of step 222 may be calculated by the processor 154 of FIG. 1 during a current drive cycle based on information retrieved from the second accumulator 168 of the memory 156 of FIG. 1 in the current drive cycle.

The process then proceeds to the above-referenced step 214, using the average energy consumption value of the second time interval from step 222. Specifically, the range is preferably estimated by the processor 154 using the amount of energy of step 204 and the average energy consumption value from step 222. The amount of energy of step 204 is preferably divided by the average energy consumption value of step 222 to calculate an estimated distance that the vehicle is expected to be able to travel on RESS power before the vehicle shuts down. As discussed above, the range may be provided to the driver (for example, on a display in a cockpit of the vehicle) to allow the driver to plan accordingly, for example by charging the RESS further before travelling a distance that exceeds the estimated range.

Returning now to step 220, if it is determined that the current temperature of step 202 is inconsistent with the average temperature of step 218, then the process proceeds to the above-referenced step 216, as the aggregate average energy consumption value is obtained. As described above, the aggregate average energy consumption value comprises an average value of energy consumption per unit of distance (for example, kilowatt*hours per mile or kilowatt*hours per kilometer) used by the vehicle during the most recent previous drive cycles, regardless of the time of day in which the drive cycles occurred.

The process then proceeds to the above-referenced step 214, but using the aggregate average energy consumption value of step 216. Specifically, the range is preferably estimated by the processor 154 using the amount of energy of step 204 and the aggregate average energy consumption value from step 216. The amount of energy of step 204 is preferably divided by the aggregate average energy consumption value of step 216 to calculate an estimated distance that the vehicle is expected to be able to travel on RESS power before the vehicle shuts down. As discussed above, the range may be provided to the driver (for example, on a display in a cockpit of the vehicle) to allow the driver to plan accordingly, for example by charging the RESS further before travelling a distance that exceeds the estimated range.

The process 200 is described above in connection with three accumulators, namely: (i) a first accumulator representing the first time interval, (ii) a second accumulator representing the second time interval, and (iii) a third accumulator representing all time intervals combined. Similar to the discussion above, additional time intervals and accumulators may be used, for example corresponding to more specific intervals of the day (for example, hourly increments, two hour increments, and the like). In such cases, the range estimation of step 214 additional steps and branches of the process 200 would be utilized.

FIG. 3 is a flowchart of a process 300 for generating average prior energy usage values for use in estimating the range in the process 200 of FIG. 2, in accordance with an exemplary embodiment. Specifically, the process 300 is used to calculate the average temperature values of steps 208 and 218 of FIG. 2 and the average energy consumption values of steps 212, 216, and 222 of FIG. 2. The process 300 is preferably performed over multiple drive cycles preceding the current drive cycle referenced in the process 200 of FIG. 2.

In the depicted embodiment, the process 300 begins once the propulsion system of the vehicle is active (step 302). A distance travelled by the vehicle is measured (step 304). Preferably, the distance travelled is measured by one or more mileage sensors 152 of FIG. 1 and provided to the processor 154 of FIG. 1 throughout the drive cycle.

In addition, an amount of energy usage is measured for the RESS (step 306). Preferably, the amount of energy usage is measured by one or more of the RESS sensors 150 of FIG. 1 and provided to the processor 154 of FIG. 1 throughout the drive cycle, and/or RESS data and/or inputs are provided by the RESS sensors 150 of FIG. 1 to the processor 154 of FIG. 1 for use in calculating the amount of energy usage throughout the drive cycle. In one preferred embodiment, a current sensor is used to measure the amount of energy that leaves the RESS during operation.

A temperature outside the vehicle is also measured (step 308). The temperature preferably comprises an ambient air temperature outside, but proximate, the vehicle. Preferably, the temperature is measured by one or more temperature sensors 148 of FIG. 1 and provided to the processor 154 of FIG. 1 throughout the drive cycle.

An average value of energy consumption per mile is calculated, regardless of the time of day (step 310). In addition, an average temperature is calculated, regardless of the time of day (step 311). In one preferred embodiment, the average temperature comprises an average temperature over the current elapsed time of the current drive cycle. Specifically, in one embodiment, the elapsed time is marked as the time between the starting of the vehicle, or when the propulsion system becomes active, and when the vehicle is turned off, or when the propulsion system becomes inactive. The calculations of steps 310 and 311 are preferably performed by the processor 154 of FIG. 1. The average value of energy consumption of step 310 and the average temperature value of step 311 are stored in memory (step 312). Specifically, in a preferred embodiment, the average value of energy consumption of step 310 and the average temperature value of step 311 are stored in the third accumulator 170 in the memory 156 of FIG. 1 as aggregate average values for subsequent retrieval by the processor 154 of FIG. 1 in step 216 of the process 200 of FIG. 2 in a subsequent drive cycle for the vehicle. The temperature and energy consumption values of the third accumulator 170 preferably include composite aggregate average values of temperature and energy consumption, respectively, from the current drive cycle of FIG. 3 averaged with respective values calculated during other, previous drive cycles regardless of the time of day in which the drive cycles occurred.

A time of day is obtained (step 314). The time of day is preferably obtained at the beginning of the drive cycle. In one embodiment, the time of day is measured by the clock 140 of FIG. 1 and provided to the processor 154 of FIG. 1. In another embodiment, the time of day is determined at least in part by the processor 154 of FIG. 1.

A determination is made as to which time interval corresponds with the time of day of step 314 (step 316). In one embodiment, the time intervals of step 316 (and the process 300) correspond to the time intervals of the process 200 of FIG. 2. Accordingly, in the depicted embodiment, the time intervals comprise at least a first, relatively warmer, time interval, and at least a second, relatively cooler, time interval. Similar to the discussion above in connection with FIG. 2, in one embodiment, the time interval is selected from two possible general times of day, namely a daytime (or relatively warmer) time interval and a nighttime (or relatively cooler) time interval. In one example, the daytime interval is between 10:00 am and 10:00 pm, and the nighttime interval is between 10:00 pm and 10:00 am. However, similar to the discussion above, the particular time intervals and/or the number thereof may vary.

If it is determined in step 316 that the current time of day corresponds to the second (relatively cooler) time interval, then an average value of energy consumption per mile is calculated for the drive cycle during the second time interval (step 318). In addition, an average temperature is calculated for the drive cycle during the second time interval (step 320). The calculations of steps 318 and 320 are preferably performed by the processor 154 of FIG. 1. The average value of energy consumption of step 318 and the average temperature value of step 320 are stored in memory (step 322). Specifically, in a preferred embodiment, the average value of energy consumption of step 318 and the average temperature value of step 320 are stored in the second accumulator 168 in the memory 156 of FIG. 1 as average values for subsequent retrieval by the processor 154 of FIG. 1 in steps 218 and 222, respectively, of the process 200 of FIG. 2 in a subsequent drive cycle for the vehicle. The temperature and energy consumption values of the second accumulator 168 preferably include composite average values of temperature and energy consumption, respectively, from the current drive cycle of FIG. 3 averaged with respective values calculated during other, previous drive cycles in which the time of day corresponded to the second time interval.

Conversely, if it is determined in step 316 that the current time of day corresponds to the first (relatively warmer) time interval, then an average value of energy consumption per mile is calculated for the drive cycle during the first time interval (step 324). In addition, an average temperature is calculated for the drive cycle during the first time interval (step 326). The calculations of steps 324 and 326 are preferably performed by the processor 154 of FIG. 1. The average value of energy consumption of step 324 and the average temperature value of step 326 are stored in memory (step 328). Specifically, in a preferred embodiment, the average value of energy consumption of step 324 and the average temperature value of step 326 are stored in the first accumulator 166 in the memory 156 of FIG. 1 as average values for subsequent retrieval by the processor 154 of FIG. 1 in steps 208 and 212, respectively, of the process 200 of FIG. 2 in a subsequent drive cycle for the vehicle. The temperature and energy consumption values of the first accumulator 166 preferably include composite average values of temperature and energy consumption, respectively, from the current drive cycle of FIG. 3 averaged with respective values calculated during other, previous drive cycles in which the time of day corresponded to the first time interval.

As mentioned above, the nature and/or number of the time intervals may vary. For embodiments in which more than two time intervals are utilized, then additional branches and steps of the process 300 of FIG. 3 would be utilized to calculated average temperature and energy usage values for each of the time intervals, as well as aggregate, average temperature and energy usage values across all of the time intervals.

Accordingly, methods, systems, and vehicles are provided for estimating the range of a vehicle with a RESS. For example, potentially improved estimations of the vehicle range are made using a current time of day along with average energy usage values for the time of day from previous drive cycles.

It will be appreciated that the disclosed methods, systems, and vehicles may vary from those depicted in the Figures and described herein. For example, the vehicle 100, the range estimation system 124, and/or various components thereof may vary from that depicted in FIG. 1 and described in connection therewith. In addition, it will be appreciated that certain steps of the processes 200, 300 may vary from those depicted in FIGS. 2 and 3 and/or described above in connection therewith. It will similarly be appreciated that certain steps of the process described above may occur simultaneously or in a different order than that depicted in FIGS. 2 and 3 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

We claim:

1. A method for estimating a range of a vehicle with a rechargeable energy storage system (RESS) for a current drive cycle, the method comprising:
   obtaining a time of day for the current drive cycle;
   determining a particular time interval corresponding to the time of day, wherein the particular time interval comprises one of a plurality of time intervals, each time interval generally associated with a respective temperature range relative to other of the plurality of time intervals;
   determining an amount of energy available from the RESS;
   calculating an average amount of energy used by the vehicle during a first plurality of previous drive cycles, each of the first plurality of previous drive cycles occurring during the particular time interval of a respective day; and
   estimating, via a processor, the range for the vehicle based on the amount of energy available from the RESS and the average amount of energy used by the vehicle during the first plurality of previous drive cycles.

2. The method of claim 1, further comprising:
   measuring a temperature outside the vehicle;
   wherein the step of estimating the range for the vehicle comprises the step of estimating the range for the vehicle based on the time of day, the amount of energy available in the RESS, and the temperature outside the vehicle.

3. The method of claim 1, wherein determining the particular time interval corresponding to the time of day further comprise selecting either a daytime time interval or a nighttime time interval.

4. The method of claim 1, wherein the step of calculating the average amount of energy used from the RESS during the first plurality of previous drive cycles comprises the steps of:
   measuring a distance travelled by the vehicle during the first plurality of previous drive cycles;
   determining a total energy usage from the RESS during the first plurality of previous drive cycles; and
   calculating the average amount of energy used from the RESS during the first plurality of previous drive cycles using the distance travelled and the total energy usage.

5. The method of claim 1, further comprising the steps of:
   measuring a temperature outside the vehicle; and
   calculating an aggregate average amount of energy used from the RESS during a second plurality of previous drive cycles, regardless of the time of day of the drive cycles;
   wherein the step of estimating the range for the RESS comprises the steps of:
      estimating the range for the vehicle based on the amount of energy available and the average amount of energy used from the RESS during the first plurality of previous drive cycles, if the temperature is within an expected range for the particular time interval; and
      estimating the range for the vehicle based on the amount of energy available and the aggregate average amount of energy used from the RESS during the second plurality of previous drive cycles, if the temperature is not within the expected range for the particular time interval.

6. A system for estimating a range of a vehicle with a rechargeable energy storage system (RESS) for a current drive cycle, the system comprising:
   an RESS sensor unit configured to measure one or more input values pertaining to the RESS; and
   a processor coupled to the RESS sensor unit and configured to:
      determine an amount of energy available from the RESS using the one or more input values;
      obtain a time of day;
      determine a particular time interval corresponding to the time of day, wherein the particular time interval comprises one of a plurality of time intervals, each time interval generally associated with a respective temperature range relative to other of the plurality of time intervals;
      calculate an average amount of energy used from the RESS during a first plurality of previous drive cycles, each of the first plurality of previous drive cycles occurring during the particular time interval of a respective day; and
      estimate the range for the vehicle based on the amount of energy available and the average amount of energy used from the RESS during the first plurality of previous drive cycles.

7. The system of claim 6, further comprising:
   a temperature sensor configured to measure a temperature outside the vehicle;
   wherein the processor is further configured to estimate the range for the vehicle based on the time of day, the amount of energy available in the RESS, and the temperature outside the vehicle.

8. The system of claim 6, wherein the particular time interval is selected from a daytime time interval and a nighttime time interval.

9. The system of claim 6, further comprising:
   a mileage sensor configured to measure a distance travelled by the vehicle during the first plurality of previous drive cycles;
   wherein the processor is coupled to the mileage sensor and is further configured to:
      determine a total energy usage from the RESS during the first plurality of previous drive cycles; and
      calculate the average amount of energy used from the RESS during the first plurality of previous drive cycles using the distance travelled and the total energy usage.

10. The system of claim 6, further comprising:
    a temperature sensor configured to measure a temperature outside the vehicle;
    wherein the processor is coupled to the temperature sensor and is further configured to:
    calculate an aggregate average amount of energy used from the RESS during a second plurality of previous drive cycles, regardless of the time of day of the drive cycles;
    estimate the range for the vehicle based on the amount of energy available and the average amount of energy used from the RESS during the first plurality of previous drive cycles, if the temperature is within an expected range for the particular time interval; and estimate the range for the vehicle based on the amount of energy available and the aggregate average amount of energy used from the RESS during the second plurality of previous drive cycles, if the temperature is not within the expected range for the particular time interval.

11. A vehicle comprising:
a drive system including a rechargeable energy storage system (RESS); and
an estimation system coupled to the RESS and configured to estimate a range for the vehicle, the estimation system comprising:
a sensor unit configured to measure one or more input values pertaining to the RESS; and
a processor coupled to the sensor unit and configured to:
determine an amount of energy available for the RESS using the one or more input values;
obtain a time of day;
determine a particular time interval corresponding to the time of day, wherein the particular time interval comprises one of a plurality of time intervals, each time interval generally associated with a respective temperature range relative to other of the plurality of time intervals;
calculate an average amount of energy used from the RESS during a first plurality of previous drive cycles, each of the first plurality of previous drive cycles occurring during the particular time interval of a respective day; and
estimate the range for the vehicle based on the amount of energy available and the average amount of energy used from the RESS during the first plurality of previous drive cycles.

12. The vehicle of claim 11, wherein the estimation system further comprises:
a temperature sensor configured to measure a temperature outside the vehicle;
wherein the processor is further configured to estimate the range for the vehicle based on the time of day, the amount of energy available, and the temperature outside the vehicle.

13. The vehicle of claim 11, wherein the estimation system further comprises:
a mileage sensor configured to measure a distance travelled by the vehicle during the first plurality of previous drive cycles;
wherein the processor is coupled to the mileage sensor and is further configured to:
determine a total energy usage from the RESS during the first plurality of previous drive cycles; and
calculate the average amount of energy used from the RESS during the first plurality of previous drive cycles using the distance travelled and the total energy usage.

14. The vehicle of claim 11, wherein the estimation system further comprises:
a temperature sensor configured to measure a temperature outside the vehicle;
wherein the processor is further configured to:
calculate an aggregate average amount of energy used from the RESS during a second plurality of previous drive cycles, regardless of the time of day of the drive cycles;
estimate the range for the vehicle based on the time of day, the amount of energy available, and the average amount of energy used from the RESS during for the first plurality of previous drive cycles, if the temperature is within an expected range for the particular time interval; and
estimate the range for the vehicle based on the time of day, the amount of energy available in the RESS, and the aggregate average amount of energy used from the RESS during the second plurality of previous drive cycles, if the temperature is not within the expected range for the particular time interval.

* * * * *